Nov. 26, 1957 R. I. H. CLARK 2,814,673

TELEPHONE SYSTEMS

Filed Dec. 14, 1954 3 Sheets-Sheet 1

Inventor
RONALD ISAAC HERBERT CLARK
By Robert B. Larson
Attorney

Inventor
RONALD ISAAC HERBERT CLARK
By Robert B. Larson
Attorney

Nov. 26, 1957 R. I. H. CLARK 2,814,673

TELEPHONE SYSTEMS

Filed Dec. 14, 1954 3 Sheets-Sheet 3

Inventor

RONALD ISAAC HERBERT CLARK

By

Robert R. Larson Attorney 2,814,673
Patented Nov. 26, 1957

2,814,673

TELEPHONE SYSTEMS

Ronald Isaac Herbert Clark, Bickley, England, assignor to Siemens Edison Swan Limited, a corporation of Great Britain Application December 14, 1954, Serial No. 475,155

Claims priority, application Great Britain January 22, 1954

8 Claims. (Cl. 179—18)

Figure 1:
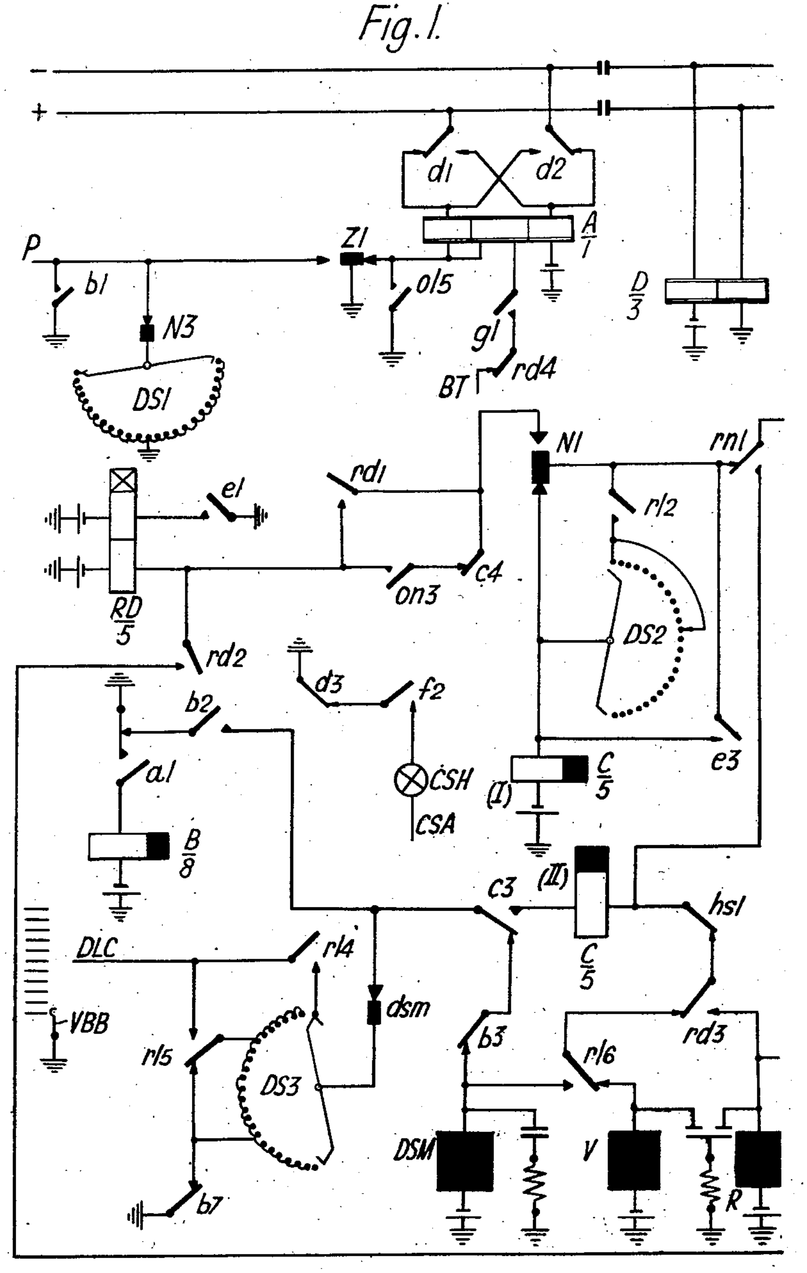

This invention relates to telephone systems and more particularly to systems in which a subscriber's designation always comprises a constant number of digits. If such a system includes party lines these may, in general, be connected according to one of two known methods. In one method, each party has a different contact allotted to it in the final selector banks, all such contacts being commoned and the last digit dialled selects the particular line of an ordinary subscriber or the ringing code to be applied to a party line. In the other method, a party line is connected to a single contact position in the final selector banks and the selection of the particular party on the line or the ringing code to be applied to the line for calling the particular party is effected by an additional digit or digits which usually follows the units digit designating the wanted line. In a system of the kind above referred to and employing the second mentioned method of connecting party lines it is obvious that, for the same route to a final selector, one or more digits in excess of those needed for the selection of an ordinary line will be needed for the selection of a party line and the calling of a subscriber connected to it. If the constant number of digits permits the use of the extra digit or digits necessary for selection of a party on a party line, less digits will be required for selection of an ordinary line connected to the same final selector. To meet this case the superfluous digit or digits of the designation of an ordinary line may be absorbed and the present invention more particularly concerns a system in which such arrangements are employed.

According to one feature of the invention a final selector has connected to it ordinary lines and party lines, the selector being arranged to receive three digits the first of which determines whether the line called is an ordinary line or a party line and if the determination is in favour of an ordinary line the digit is absorbed and selection proceeds in response to the second and third digits but if the determination is in favour of a party line the digit is not absorbed and of the remaining two digits one is utilised to select the line and the other to select the party to be called and/or ringing to be applied to the line.

As the ordinarily used dial is only adapted to transmit up to ten impulses a selection of ringing codes by a single digit and using a loop circuit can only be used if the number of parties on a line does not exceed ten. For selection among more than ten parties other arrangements must be provided.

According to another feature of the invention a party line is connected to a position in each of a plurality of decades in the banks of final selectors serving ordinary and party lines, the parties connected in each decade being identified by different digital values of the decade selecting digit.

According to another feature of the invention, for the selection of a party line and a party on the line the first digit received at a final selector serving ordinary and party lines selects the decade in which the line is connected, the second digit received selects the ringing code and the third digit received selects the contact in the selected decade to which the party line is connected. For the selection of an ordinary line the first digit is absorbed.

P. B. X groups of lines may also be connected to the final selectors if required, the modification of a final selector to serve either individual lines or P. B. X groups being well known and the term ordinary lines used herein is intended to include P. B. X groups.

In carrying out the invention a final selector serving ordinary and party lines includes a stepping switch for the selection of the ringing code to be applied to a party line and discriminating relays connected to a set of decade contacts, one of the discriminating relays on operation effecting absorption of the digit signifying a decade for which absorption is required and another of the discriminating relays on operation directing the impulse repeating circuit from the final selector driving mechanism to the driving mechanism of the stepping switch. A third discriminating relay may provide for determining that the selector has been restored to normal after a digit absorbing operation and for determining that the stepping switch has been set by a later digit received at the final selector if the first digit has not been absorbed. The determination so provided may guard against later release during digit reception and may condition the circuits for the ultimate testing of the called line. To cater for party lines connected in two decades a second set of decade contacts may be provided to provide a driving circuit for the stepping switch to select a ringing code connected to another part of its bank. The same result may be had by selecting a different wiper of the stepping switch that selects the code.

Figure 2:
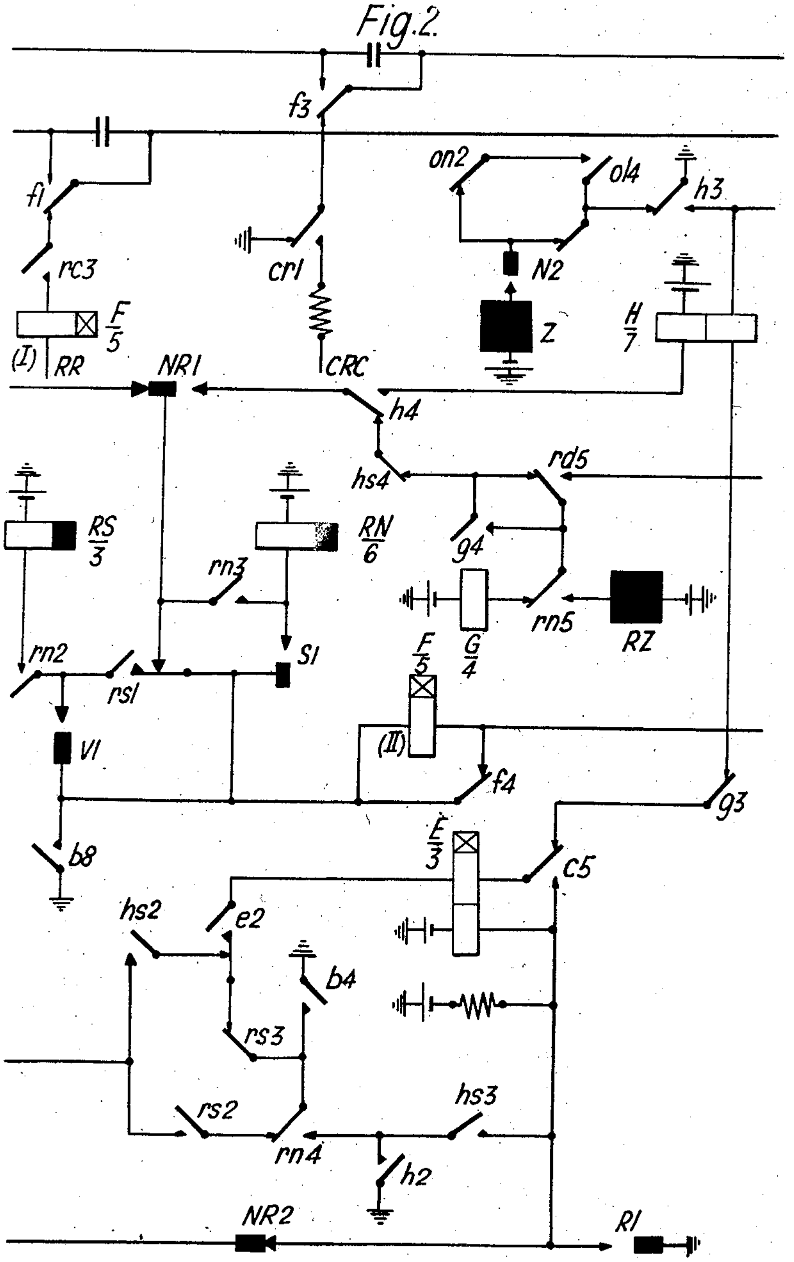
Figure 3:
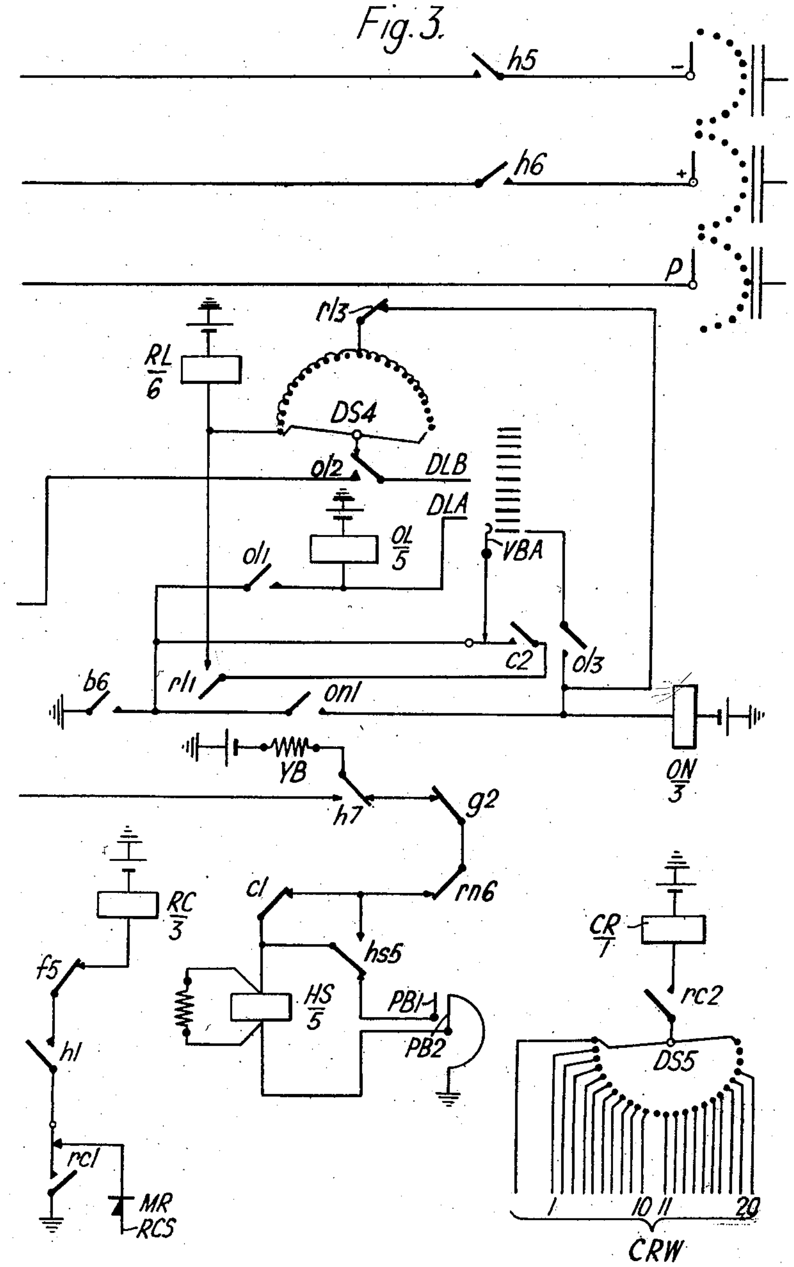

Circuit arrangements at a final selector for carrying out the invention will now be described by way of example with reference to the accompanying drawings. The drawings, which comprise Figs. 1, 2 and 3 show the circuits of a pawl and ratchet driven two motion final selector and include a stepping switch for the selection of the ringing code to be applied to a party line. The figures should be arranged with Fig. 1 on the left, Fig. 3 on the right and Fig. 2 between Figs. 1 and 3. The final selector shown caters for individual lines, P. B. X lines and party lines having up to 20 parties connected to each line. The final selector itself comprises the vertical stepping magnet V, the rotary stepping magnet R, rotary release magnet RZ and release magnet Z. The release of the selector takes place in the opposite direction to its setting, that is, it traverses the bank contacts backwards from the contacts to which it was set until it is clear of the first contacts in the banks and then restores vertically to its normal position. Operation of magnet RZ effects rotary release only and operation of magnet Z effects complete restoration to normal. Besides the magnets referred to there is the usual contact bank for the negative, positive and test wires, and associated wipers, these latter being designated —, + and P respectively and a P. B. X arc with wipers designated PB1 and PB2 for controlling the stepping of the selector over lines of a P. B. X group. There are also two sets of decade contacts adapted to be engaged by the wipers VBA and VBB respectively which partake only in the vertical motion of the switch. There are also vertical off-normal contacts designated N1, N2 and N3, rotary off-normal contacts designated NR1 and NR2, shaft, or last rotary position contacts designated S1, and magnet operated contacts *v1* operated by the vertical magnet V, *r1* operated by the rotary magnet R and *z1* operated by the release magnet Z. In the final selector is a feeding bridge with feed to the calling side over impulse receiving relay A and feed to the called side over answering supervisory relay D. Of the other relays shown B is a slow releasing release control relay, C a two-winding slow releasing dialling relay, E is a slow operating relay that provides for a fleeting test of a called line by the test relay H, G is a busy relay, HS is a relay for effecting stepping by the final selector over contacts connected to lines of a P. B. X group, F is a ring-tripping relay, RD is a steering relay, RN and RS are relays for use when large groups of P. B. X lines are connected to the selector. Relays RC and CR are concerned with ringing. For digit absorption there are three discriminating relays, OL, ON and RL. Associated with the final selector is a single motion stepping switch comprising stepping magnet DSM with self-drive contact *dsm* and 5 arcs of contacts the associated wipers of which are designated DS1–DS5.

The circuits operate in the following manner. The final selector tests free by reason of absence of earth on the incoming test wire *p*. When the selector is taken into use relay A operates in a circuit from earth over contact *z1*, its left hand winding, contact *d1* a closed loop over the + and — wires, contact *d2* and the right hand winding of the relay to battery. Contact *a1* closes a circuit for relay B which thereupon operates. Contact *b1* earths wire *p* to mark the selector engaged, contact *b2* prepares the impulse repeating circuit, contact *b3* opens a point in a possible circuit for magnet DSM, contact *b5* opens a point in a possible circuit for magnet Z and contact *b6* connects earth over the contact *c2* to vertical wiper VBA, but this circuit is opened almost immediately by the operation of relay C in the following circuit: earth over contacts *b8*, *rs1*, NR1, *rn1*, N1, winding (I) of relay C to battery. Contact *b7* disconnects earth from the contacts in the arc of wiper DS3. Relay C operates in the above described circuit and at contact *c2* disconnects earth over contact *b6* from wiper VBA and prepares a holding circuit for relay RL and contact *c3* completes a circuit for holding relay C by means of its low resistance winding (II) in series with the stepping magnets of the selector during the break period of impulses. The first train of impulses is now received. It will first be assumed that the call is for a subscriber on an individual line. Levels in which only individual lines or lines of P. B. X groups are connected will have the level contact in the vertical bank VBA connected over wire DLA to relay OL. The impulses of the first train to be received at the final selector are repeated by relay A to the vertical magnet V, the circuit being from earth over contacts *a1*, *b2*, *c3* winding (II) of relay C, contacts *hs1*, *rd3*, *rl6*, magnet V to battery. The magnet responds to the impulses and steps the final selector wipers including the vertical wipers VBA and VBB accordingly. When the selector takes its first vertical step the vertical off-normal contacts are operated and contacts N1 open the original operating circuit for relay C, contacts N2 connect up release magnet Z and contacts N3 disconnect wiper DS1. At the end of the impulse train relay C releases. Contact *c1* prepares a circuit for relay HS in case the wanted line is one of a P. B. X group, contact *c2* closes a circuit over contact *b6*, wiper VBA, decade contact and lead DLA for relay OL, contact *c3* disconnects winding (II) of relay C, contact *c4* prepares an operating circuit for relay RD and contact *c5* prepares a holding circuit for relay E. Relay OL operates and locks over contacts *ol1* and *b6*, and at contact *ol3* connects relay ON to the normal level contact in the bank of wiper VBA, at contact *ol4* completes a circuit over contacts *h3*, *on2* and N2 for magnet Z and at contact *ol5* holds relay A during the period when magnet Z is operated. Magnet Z operates and restores the selector wipers to their normal position, that is to say, the received digit has been absorbed. When the wipers reach their normal position the circuit of magnet Z is opened at contacts N2 and the magnet releases. The other vertical off-normal contacts are restored and relay ON is operated over contact *ol3*, normal level contact and wiper VBA, contacts *c2* and *b6* and locks up directly over contact *on1* independently of wiper VBA. Contact *on2* opens in the previously closed circuit for magnet Z to prevent re-operation of the magnet when the next digit is received, and contact *on3* further prepares the operating circuit for relay RD. On the restoration of contacts N1 the originally traced operating circuit for relay C is re-closed and relay C again operates. The impulses of the second train are repeated to magnet V over the previously traced circuit and the wipers of the final selector are stepped up to the corresponding level. At the end of the train relay C releases and the following circuit is closed, earth over contacts *b8*, *rs1*, NR1, *rn1*, N1, *c4*, *on3*, lower winding of relay RD to battery. Relay RD operates and locks up over contact *rd1* independently of contact *c4* to earth over contact *b8* and contact *rd2* extends earth over contacts *rd1* and NR2 to the lower winding of relay E and contact *rd3* substitutes magnet R for magnet V in the impulse repeating circuit. Relay E operates and at contact *e1* holds relay RD by its upper winding and at contact *e3* closes an alternative operating circuit for relay C (winding (I)) which thereupon re-operates. If the impulses of the second train step the wipers of the final selector up to a level allocated to a party line the circuit operation is the same except that on the release of relay C at the end of this impulse train a circuit for the operation of relay G is completed over the wire DLB but this circuit is disconnected almost immediately by the contact *c2* on the re-operation of relay C thereby causing relay G to flick. The impulses of the third train are now received and are repeated to magnet R over the previously traced circuit but over front contact *rd3* instead of over its back contact and the selector wipers are stepped round the selected level to the required position. At the first rotary step the rotary off-normal contacts are operated; contacts NR1 opening the circuit for relay RD over contact *rd1* and contacts NR2 opening the operating circuit for relay E over contact *rd2*. When magnet R is first operated the earth extended through contacts NR2 to short circuit the upper winding of relay E is removed by the operation of contacts NR2, but the short circuit is re-applied by an earth over contacts *r1* during impulsing. During the make periods of the repeated impulses relay E is held operated over both its windings in series. At the end of the impulse train relay C releases followed by relays E and RD, relay E being released at contact *c5* and relay RD at contact *e1*. In the case of the second impulse train selecting a party line level relay G is re-operated on the release of relay C at the end of the third impulse train and locks over contact *g4*. At contact *g3* the line testing circuit is disconnected and when relay RD releases at the end of the testing period, that is the period between the release of relay C and the release of relay E, busy tone is applied over wire BT, contacts *rd4*, *g1*, the middle winding of relay A, contact *ol5*, the tone being repeated to the calling subscriber by induction. For normal operation the line is tested during the release period of relay E, relay H being connected on one side to wiper P and on the other side over contacts *g3*, *c5*, upper winding of relay E, contacts *e2*, *rs3* and *b4* to earth. If the line is free relay H will operate in series with the cut-off relay in the called line circuit. Relay H locks up over its left hand winding, contacts *h4*, NR1, *rs1* and *b8* and at contact *h3* earths wiper P to busy the line and hold the cut-off relay operated. Contacts *h5* and *h6* extend the negative and positive wire wipers back to a ringing circuit and contact *h1* connects relay RC over contact *f5* and rectifier MR to wire RCS to start a ringing cycle. Relay RC operates over wire RCS and locks up over contact *rc1* which disconnects the starting signal over wire RCS. Contact *rc2* connects relay CR over wiper DS5 to a ringing code wire CRW in this instance over the normal contact in the associated arc and a source of interrupted current and contact *rc3* connects winding (I) of ring-tripping relay F between the ringing return wire RR and the positive wire. Relay CR operates in the connection to the ringing code wire and at contact *cr1* connects a source of ringing current over wire CRC and contact *f3* to the negative wire and the called subscriber's bell is rung by ringing current interrupted at the correct periodicity. When the called subscriber answers relay F operates by means of its winding (I) over the called loop and at contact *f4* removes a short circuit from its winding (II) enabling that winding to be energised in a circuit including contacts *b8* and *h7* and resistance YB. Contacts *f1* and *f3* disconnect the ringing circuit and bridge condensers in the line circuit to connect relay D to the selecting switch line wipers and contact *f5* disconnects relay RC. Relay RC releases and at contact *rc2* disconnects relay CR. During the ringing of the wanted subscriber leakage ringing current is fed over the condensers in the line wires to give a ringing signal to the caller. Relay D now operates and at contacts *d1* and *d2* reverses the polarity of the incoming line wires to give the normal supervisory signal and contact *d3* opens in the circuit of lamp CSH. At the end of the conversation when the caller clears relay A is released and remaining released releases relay B. Contact *b8* releases relays H and F which release relay D and contact *b6* releases relays OL and ON. On the release of relay H earth is extended over contacts *h3*, *b5* and N2 to magnet Z which operates and maintains earth over contact *z1* on wire *p* so long as the magnet remains operated and restores the switch to normal. In the normal position of the selector contacts N2 open and release magnet Z. If the called subscriber clears but the caller fails to clear the opening of the called loop releases relay D and contact *d3* closes the circuit over contact *f2*, lamp C. S. H. to an alarm relay connected to wire CSA.

The case will now be considered in which the call is for a P. B. X. Wipers PB1 and PB2 co-operate with an arc in which contacts corresponding to lines of P. B. X groups except the last lines of such groups are earthed. After the end of the third impulse train relay C releases and opens the circuit of relay E and during the release period of relay E the line is tested. If the line is free relay H is operated with the results hereinbefore described. Relay HS will be connected in a circuit from earth over the contact in the special arc, wiper PB2, the winding of the relay, contact *c1*, *rn6*, *g2* and *h7* but the relay, which is shunted by a non-inductive resistance will not operate before relay H has changed over contact *h7*. If the line is busy relay H will not operate and relay HS operates and at contact *hs4* prevents operation of relay G. When relay E releases, a circuit is closed from earth over contacts *b4*, *rs3*, *e2*, *hs2*, magnet R to battery. Operation of relay HS opens contact *hs1* in the impulse repeating circuit to the selector stepping magnets, and at contact *hs5* disconnects relay HS from wiper PB1 to prevent the relay being short circuited when the selector is in engagement with an intermediate line of the group. Magnet R operates and advances the selector wipers one step. Contact *r1* operates relay E over its lower winding to release the magnet and close the test circuit for testing the second line of the group. If this line is free relay H will operate as before. The seizure of a free intermediate line in the group causes relay H to operate during the slow release period of relay E. Contact *h7* disconnects the operating circuit of relay HS but due to the slow releasing characteristic of relay HS the possibility arises of a false rotary impulse being transmitted from earth over contacts *b4*, *rs3*, *e2*, *hs2*, magnet R to battery should relay E release before relay HS. To prevent such mis-operation relay E is held operated by an earth over contacts *h2* and *hs3* until the release of relay HS. If it is busy relay H will not be operated and relay HS will remain held so that when relay E releases consequent on the opening of contact *r1* magnet R will receive another pulse of current to advance the wipers one more step. This action continues until either a free intermediate line in the group is found or the last line is reached. On the last line of a P. B. X group there will be no earth on the special arc and relay HS will release to prevent further stepping. If the number corresponding to an intermediate line of a P. B. X group should be dialled, then, following the release of relay C relay HS will be short circuited by earth over wipers PB1 and PB2 and the selector will remain on those contacts whether the line be free or busy.

If the lines of a P. B. X group occupy more than one level they will be connected in adjacent levels. When all the lines in the level in which the line bearing the directory number is situated have been tested and found busy the wipers will be stepped off the level and the contacts S1 will be operated in known manner. Relay HS will be released at wiper PB2. A circuit will now be closed from earth over contacts *b8* and S1, relay RN to battery and the relay will operate and lock over contact *rn3* and at contact *rn5* will extend earth over contacts *b8*, *rs1*, NR1, *h4*, *hs4* and *rd5* to magnet RZ to release the wipers to their rotary normal position before the first bank contacts in the level and the rotary off-normal contacts will restore, contact NR1 releasing magnet RZ. Contact *rn6* opens in the circuit of relay HS and contacts S1 are restored. A circuit from earth over contacts *b8*, *rs1*, back contacts NR1, contacts *rn1*, *hs1*, *rd3*, and *rl6* will now be closed for magnet V which operates and raises the wipers to the next level. The vertical magnet operates contact *v1* thereby closing a circuit over contacts *b8* and *rn2* for relay RS which operates. A locking path for relay RS is provided over the contacts *rn2*, *rs1*, *b8* to earth. Contact *rs1* breaks the operating circuit of relay RN which releases slowly. Relay RS releases slowly after the disconnection of its operating circuit at contact *rn2*. During the release lag of relay RS after the release of relay RN a pulse is transmitted over contacts *b4*, *rn4*, *rs2* to magnet R and the selector wipers are stepped into the bank and the rotary off-normal contacts are again operated. Contact *r1* operates relay E which in turn operates relay RD. Relay HS will re-operate since wiper PB1 will still be out of the bank and stepping over the contacts of the P. B. X group will continue as before described until a free line is found or the last contact of the group is reached. When an individual line or the last line of a P. B. X group or an intermediate line of a P. B. X group to which the selector has been set by dialling is found when tested to be busy relay H will not operate and relay G will be operated from earth over contacts *b8*, *rs1*, NR1, *h4*, *hs4*, *rd5* and *rn5* and will lock over contact *g4* independently of contact *rd5*. Contact *g1* connects the busy tone wire BT over contact *rd4* to the middle winding of relay A and thence to earth over contacts *ol5* and *z1* in parallel and the tone is repeated by induction over the calling line. Contact *g2* opens in the circuit of relay HS and contact *g3* disconnects the test circuit. The circuits remain in this condition until the caller clears. When this takes place relays A, B, OL and ON release as before described, opening of contact *b8* releasing relay G.

The case will now be considered in which a call is made to a party on a party line. If between ten and twenty parties are connected to one line the line will be connected in two levels of the final selector and some of the parties not exceeding ten in number will be selectable by one tens digit and the other parties likewise not exceeding ten in number will be selectable by another tens digit. Consideration will first be given to the case in which not more than ten parties are connected to a line. Levels containing contacts connected to party lines have the decade contacts connected to wire DLB. The first train of impulses is received and repeated to magnet V to step the selector in the manner described earlier in connection with a call to an ordinary line but absorption will not take place as the decade contact marked by wiper VBA will not be connected to wire DLA but to wire DLB and when relay C releases earth will be extended over contacts *b6*, *c2*, wiper VBA and decade contact, wire DLB, contact *ol2*, wiper DS4 and normal contact to relay RL. Relay RL operates and at contact *rl1* prepares a holding circuit to be completed on the re-operation of relay C which takes place over contacts *b8*, *rs1*, NR1, *rn1*, *rl2*, normal contact and wiper DS2. Contact *rl3* disconnects the commoned contacts in the arc of wiper DS4 to prevent operation of relay ON when wiper DS4 moves off normal and contact *rl6* substitutes magnet DSM for magnet V in the impulse repeating circuit. The second train of impulses is repeated to magnet DSM which steps the single motion stepping switch accordingly. The wipers of this switch will be brought to rest on one of the first ten contacts following the normal and on the release of relay C relay RL will be released at contact *c2*. Contact *rl3* closes an operating circuit for relay ON from the earth over wiper DS4, commoned contacts in the associated arc, contact *rl3*, relay ON to battery and contact *on3* thereupon closes an operating circuit for relay RD over contacts *b8*, *rs1*, NR1, *rn1*, N1, *c4*, *on3* and the lower winding of relay RD which locks up and extends the earth over the above described circuit and contacts *rd2* and NR2 to relay E. Relay E is maintained operated during rotary stepping by means of earth pulses over contact *r1* during the make periods of the repeated impulses and by connecting its two windings in series over contact *c5* during the break periods of the impulses. Contact *rd3* connects magnet R to the impulse repeating circuit and the third impulse train is repeated to magnet R which steps the final selector wiper round the level to the contacts designated by the number of impulses received. After the last impulse has been received relay C releases and a test of the line is made by relay H during the slow release of relay E. If the line is free relay H operates and transmits a pulse over the ring cycle start wire RCS and relay RC operates and locks up dependent on relay F. Release of relay E releases relay RD. Contact *rc2* connects relay CR over wiper DS5 to the relevant code ringing wire CRW and contacts *cr1* and *rc3* connect up the ringing circuit and a code ring is transmitted to the called line by the operation and release of relay CR. Ringing signal is given to the caller in the manner previously described. When the called party answers relays F and D operate and relays RC and C are released and the circuit is then in the conversational condition. If the line is busy relay H will not operate but relay G will operate when relay RD releases and a busy signal will be reverted to the caller. Release of the connection takes place as previously described.

If more than ten parties are connected to a line the final selector will be stepped vertically to a level determined by the first digit received and if the impulses of this digit are such as to step wiper VBA to a level in which the second set of decade contacts, that is those associated with wiper VBB are not connected operations will take place in the manner immediately above described. If the impulses of the first received digit are such that the final selector is stepped to a level in which the contact in the first set of decade contacts is connected to wire DLB and the contact in the second set of decade contacts is connected to wire DLC the following operations will take place. Following release of relay C after the reception of the first digit relay RL will operate with the before described results. In addition contacts *rl4* and *rl6* will extend earth over wiper VBB, decade contact, wire DLC, contact *rl4* normal contact and wiper DS3, self-drive contacts *dsm*, front contact *c3*, winding (II) of relay C, contacts *hs1*, *rd3*, *rl6* to magnet DSM. The magnet will operate and interrupt its own circuit at contacts *dsm* and step the wipers off the normal contacts. A new circuit for magnet DSM is now closed over wiper VBB, wire DLC, contact *rl5*, commoned contacts 1 to 10 in the arc of wiper DS3, the wiper and the above traced self drive circuit and the stepping switch wipers are advanced to the 11th or mid-normal position in which the self drive is opened at wiper DS3 and relay C is maintained over the mid-normal contact in the arc of wiper DS2. This driving of the stepping switch takes place in the pause following receipt of the first digit. The second and third digits are repeated to magnets DSM and R respectively to select a ringing code connected to contacts 11 to 20 in the arc of wiper DS5 and to set the wipers of the final selector to the contacts of the wanted line in the selected level. Further operations take place similarly to those described for a call to a party to be rung by the code connected to contacts 1 to 10 of wiper DS5. Restoration to normal of the stepping switch takes place when the caller clears. Release of relay B connects magnet DSM in the self drive circuit over back contact *c3*, wiper DS3, commoned off normal contacts and contact *b7* and the switch is restored. Should the final selector reach normal first the engaged marking is maintained on wire *p* over wiper DS1 and contacts N3 until the stepping switch is completely restored.

What is claimed is:

1. In a telephone system a final selector having a plurality of lines arranged in decades connected to its bank, the lines in some decades being individual lines and the lines in other decades being party lines, each line being connected to a single contact position in the bank, wipers for co-operation with said bank contacts, mean for driving the wipers first to select a decade in accordance with a first received digit and later to select a contact in the selected decade in accordance with another received digit and a selecting device for selecting the ringing code to be applied to a called line, digit absorbing means operative by the selection by the final selector in response to a first received digit of a decade in which individual lines are connected to release the wipers to normal after they have been set in accordance with said first digit and to direct the two following digits to said driving means for the selection of a decade and of a line in that decade and other means operative by the selection by the final selector in response to a first digit received thereat of a decade in which party lines are connected to direct one of the following digits to the driving means for the selection of a line in the decade selected in accordance with said first digit and the other of the said following digits to the selecting device for the selection of the ringing code appropriate to the wanted party on the selected party line.

2. A final selector as claimed in claim 1 in which for the selection of a party line and a particular party on a selected party line the first received digit is directed to the driving means to select the decade in which the party line is situated, the second received digit is directed to the selecting device for the selection of the ringing code appropriate to the wanted party on the line and the third received digit is directed to the driving means to select the contact in the selected decade connected to the desired party line.

3. A final selector as claimed in claim 1 to which groups of private branch exchange lines are connected, the digit absorbing means being operative by the selection by the final selector in response to a first digit received thereat of a decade in which a group of private branch exchange lines is connected.

4. A final selector as claimed in claim 1 to which a group of private branch exchange lines is connected to contacts in a plurality of adjacent decades, switch contacts operable when the selector wipers reach the last contact position in a decade other than the last in sequential order of such decades containing private branch exchange lines and the line connected to said last contact position is busy to advance the selector wipers to the next decade and drive them over contacts of the group of private branch exchange lines in said next decade in search of a free line.

5. In a telephone system a final selector having a plurality of lines arranged in decades connected to its bank individual lines being connected in some decades and party lines being connected in other decades, an individual line being connected to a single contact position in the bank and a party line being connected to a single contact position in each of a plurality of decades in the bank, some of the parties on a party line being designated by one value of a decade selecting digit and other of the parties on the same party line being designated by another value of a decade selecting digit, wipers for co-operating with said bank contacts, means for driving the wipers first to select a decade in accordance with a first received digit and later to select a contact in the selected decade in accordance with another received digit and a selecting device for the selection of the ringing code to be applied to a called line, digit absorbing means operative by the selection by the final selector in response to a first digit received thereat of a decade in which individual lines are connected to release the wipers to normal after they have been set in accordance with said first digit and to direct the two following digits to said driving means for the selection of a decade and of a line in that decade and other means operative by the selection by the final selector in response to a first digit received thereat of a decade in which party lines are connected to direct one of the following digits to the driving means for the selection of a line in the decade selected in accordance with the first received digit and the other of the said following digits to the selecting device for the selection of the ringing code appropriate to the wanted party on the selected party line.

6. In a telephone system a two-motion final selector having a plurality of lines connected in levels in its bank, individual lines being connected in some levels and party lines being connected in other levels, each line being connected to a single contact position in the bank, wipers co-operating with said bank contacts, a set of level contacts, a first motion driving means for the selection of a level in accordance with the first digit received at the final selector, a second motion driving means for the selection within the level selected by the first received digit of a contact in response to a later received digit, digit absorbing means operative over the level contact of the level selected by the first received digit in response to a first digit designating a level containing individual lines to release the wipers to normal after they have been set in accordance with said first digit and to direct the following digit to said first and second driving means respectively, a relay connected to contacts in the set of level contacts corresponding to the level in which party lines are connected, a code selecting switch for selecting the ringing code to be applied to a called line and driving means for said switch, said relay being operated by the selection of a level in which party lines are connected and held during reception of the second of the three digits received at the final selector to connect the driving means for the code selecting switch in place of the selector driving means and released after receipt of said second digit to disconnect the driving means for the code selecting switch and to connect up the second motion selector driving means.

7. In a telephone system a two-motion final selector having a plurality of lines connected in levels in its bank, individual lines being connected in some levels and party lines being connected in other levels, an individual line being connected to a single contact position in the bank and a party line being connected to a single contact position in each of two levels in the selector bank, a first motion wiper driving means for the selection of a level in accordance with a first received digit, a second motion wiper driving means for the selection of a contact in the selected level in accordance with a later received digit, a code selecting switch for the selection of the ringing code to be applied to a called line and driving means for said switch, one set of ringing code wires connected in one part of the bank of the code selecting switch and corresponding to parties on a party line connected in one of said two levels and another set of ringing code wires connected in another part of the bank of the said code selecting switch and corresponding to parties on a party line connected in the other of the said two levels, a set of level contacts selectable by said first motion driving means, contacts in said set corresponding to parties for which the ringing code is to be selected over one of the parts of the code selecting switch bank connected to means for selecting said one part, digit absorbing means operative by the selection by the final selector in response to a first digit received thereat of a level in which individual lines are connected to release the wipers to normal after they have been set in accordance with said first digit and to direct the two following digits to said first and second driving means respectively and other means operative by the selection by the final selector in response to a first digit received thereat of a level in which party lines are connected to direct one of the following digits to the said second motion driving means and the other of the said following digits to the driving means for the code selecting switch.

8. A final selector as claimed in claim 7 in which the bank of the code selecting switch has a normal contact position, a first set of positions connected to one set of ringing code wires, a mid-normal contact position and a second set of positions connected to another set of ringing code wires all arranged in sequence, a self-drive circuit for the driving means for said code selecting switch connected to the contact in the set of level contacts corresponding to levels in which parties on a party line requiring ringing codes selected from second set of positions are connected for driving the code selecting switch to said mid-normal contact position.

References Cited in the file of this patent

UNITED STATES PATENTS

| | | |
|---|---|---|
| 1,872,720 | Flenley | Aug. 23, 1932 |
| 1,891,423 | Kahu | Dec. 20, 1932 |
| 2,583,782 | Lomax | Jan. 29, 1952 |